Figure 1:
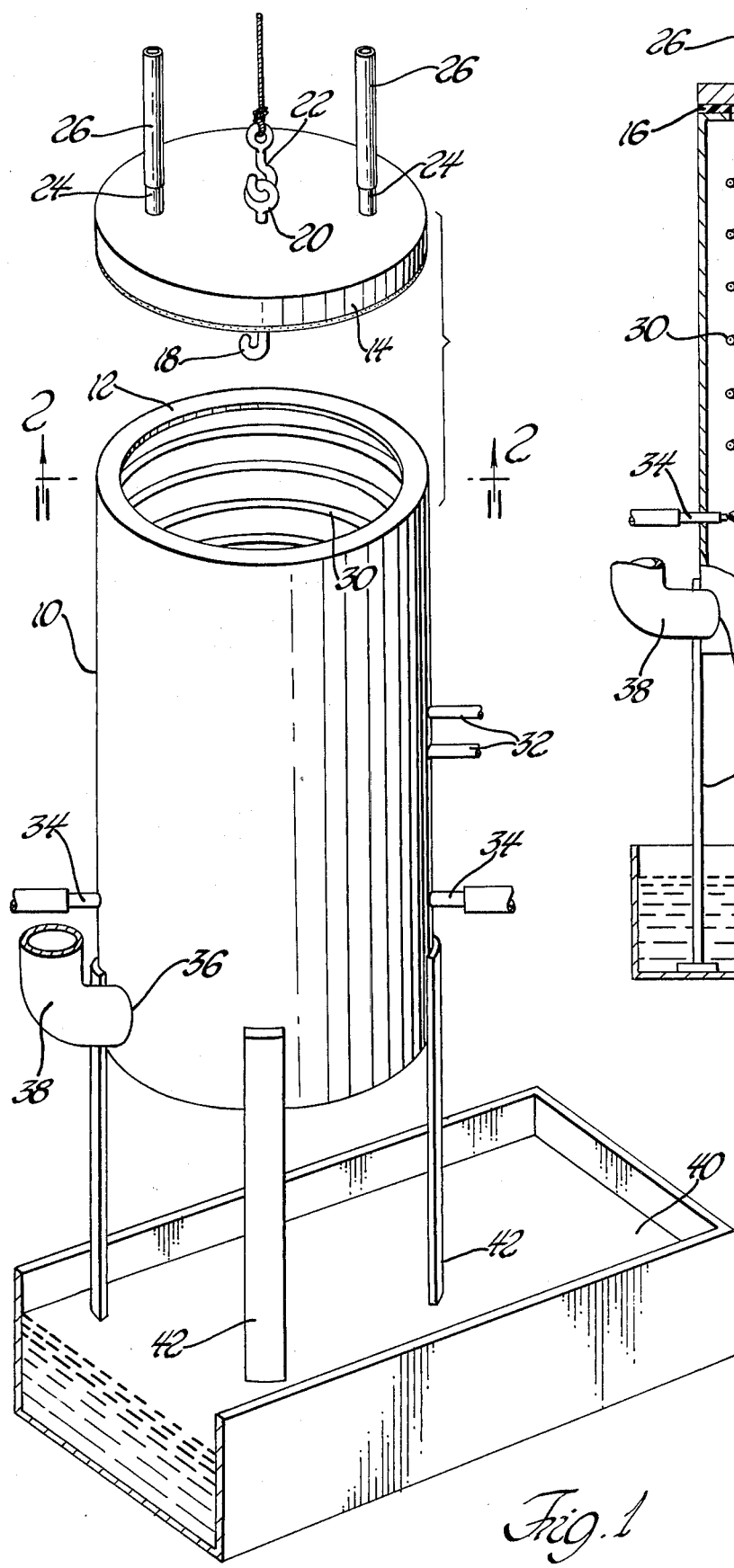

United States Patent [19]
Lavins, Jr.

[11] B 3,923,653
[45] Dec. 2, 1975

[54] METHOD FOR CLEANING METALLIC FILTERS OF PLASTIC WASTE

[75] Inventor: Paul N. Lavins, Jr., Grosse Pointe Farms, Mich.

[73] Assignee: American Induction Heating Corporation, Detroit, Mich.

[22] Filed: Sept. 27, 1972

[21] Appl. No.: 292,563

[44] Published under the Trial Voluntary Protest Program on January 28, 1975 as document no. B 292,563.

[52] U.S. Cl. ..................... 210/71; 55/220; 55/282; 55/DIG. 10; 134/1; 134/5; 134/19; 210/79; 219/10.57
[51] Int. Cl.² ..................... B01D 35/18; B08B 7/00
[58] Field of Search ............ 134/1, 5, 19, 42; 219/10.57; 29/403, DIG. 7; 432/253; 55/220, DIG. 10, 282; 156/344; 210/71, 79, 184, 186, 407, 408

[56] References Cited
UNITED STATES PATENTS

| | | | |
|---|---|---|---|
| 81,164 | 8/1868 | Sturdevant | 134/5 |
| 2,280,064 | 4/1942 | Dennen et al. | 219/10.57 |
| 2,291,862 | 8/1942 | Bailey | 156/344 X |
| 2,917,418 | 12/1959 | Cathcart | 134/5 |
| 3,250,643 | 5/1966 | Sergent | 134/5 |
| 3,374,117 | 3/1968 | Savage | 134/19 |
| 3,398,252 | 8/1968 | Bock et al. | 219/10.77 |
| 3,435,172 | 3/1969 | Emerson | 219/10.77 |
| 3,485,670 | 12/1969 | Fisher | 134/5 |
| 3,494,794 | 2/1970 | Hittel | 134/19 |

Primary Examiner—S. Leon Bashore
Assistant Examiner—M. Steven Alvo
Attorney, Agent, or Firm—Krass & Young

[57] ABSTRACT

A metal filter clogged with polyethylene waste is cleaned by suspending it within an induction heating coil in a nitrogen atmosphere and passing current through the coil so as to first raise the temperature of the filter above the melting temperature of the polyethylene but below the auto ignition temperature of the polyethylene. This heating is continued until the bulk of the plastic melts and falls into a water tank supported below the boil. The current through the coil is then raised to heat the filter above the auto-ignition temperature of the polyethylene causing the remaining plastic on the filter to decompose.

5 Claims, 2 Drawing Figures

U.S. Patent  Dec. 2, 1975  3,923,653

METHOD FOR CLEANING METALLIC FILTERS OF PLASTIC WASTE

FIELD OF THE INVENTION

This invention relates to method and apparatus for cleaning metal elements of plastic waste by inductively heating the elements in an oxygen-free atmosphere.

BACKGROUND OF THE INVENTION

Metal apparatus such as filters, pipes, screens and the like, used in processing and making plastics, often become coated and clogged with the plastic and must be periodically cleaned. For example, filters used in apparatus to process polyethylene terephthalate quickly become clogged with plastic and present great difficulty in cleaning. That is described in U.S. Pat. Nos. 2,917,418 and 3,485,670. These patents also describe the disadvantages associated with the traditional cleaning techniques such as mechanically removing the unwanted residues with scraping, brushing or other abrasive devices or dissolving the residues with a hot solvent. As an advantageous alternative to these processes, the patents referred to disclose a process of first melting and then vaporizing the residue by blasting it with hot gases and finally burning away the build-up left on the filters. This process is inherently quite slow, requiring a number of hours for completion and results in large quantities of fumes which create an atmospheric pollution problem.

A need therefore exists for a thorough, rapid cleaning method which does not present difficult waste elimination problems.

SUMMARY OF THE PRESENT INVENTION

The present invention is directed to a method of cleaning metallic components of accumulated plastic coatings, residues and wastes, and to apparatus for practicing that method which is highly efficient in cleaning ability, rapid in operation, low in cost, and does not present any difficult waste disposal problems.

The broadest aspect of the present invention contemplates the induction heating of a metal part with plastic residues on its surface in an atmosphere purged of oxygen so that no combustion occurs. The induction heating results in the plastic being heated at its interface with the metallic part to loosen the adhesive grip of the plastic on the part. This heating is performed so as to raise the plastic temperature at least adjacent to the metal interface, to above its melting point but below its auto-ignition point. The heating is continued until the gravitational forces on the plastic exceed the strength of the weakened bond between the plastic and metal and cause the mass of the plastic to fall from the metal component. The part is then left with a coating of a relatively thin layer of the plastic which is removed by increasing the induced temperature beyond the auto-ignition point of the plastic while maintaining the oxygen-free atmosphere. This causes the plastic to decompose and fall off of the metal component.

The process of the present invention has been employed to clean cylindrical metal screen packs which were clogged and coated with polyethylene. The induced currents are initially controlled so as to raise the temperature of the mass of the plastic, as heated by conduction from the screen pack, to about 400° F in a nitrogen atmosphere. After a few minutes, the solid mass of the polyethylene drops out of the screen pack. The temperature of the pack is then increased to about 900° F and is held at that temperature for about 10 minutes. The remaining material decomposes and falls from the screen pack leaving a clean surface. The entire process requires about 35 minutes as compared to the several hours involved in the prior art processes as described in the above-noted patents.

Apparatus for practicing the invention broadly takes the form of means for hanging an object to be cleaned within an induction heating coil without any lower support. This creates a space for the molten plastic and the plastic residue to fall clear of the article during heating. A tank of quenching fluid, preferably water, is disposed beneath the heating coil to receive and quickly cool the plastic waste. The induction heating is performed within a chamber which is continually ventilated with non-combustible gas, preferably nitrogen.

In a preferred embodiment of the apparatus for practicing the inventive method, which will subsequently be disclosed in detail, a water spray is located below the induction heating coil so the plastic waste passes through the spray and is thus cooled before falling into the water tank. The entire apparatus is elevated sufficiently above the water tank to allow removal of the plastic waste from the tank.

While the preferred embodiment of the invention is employed to remove polyethylene from filter packs, the invention may be used to clean any metallic article of a plastic or other non-conductive coating material which melts below its auto-ignition temperature and which has an auto-ignition temperature which is not harmful to the metallic element.

Figure 2:
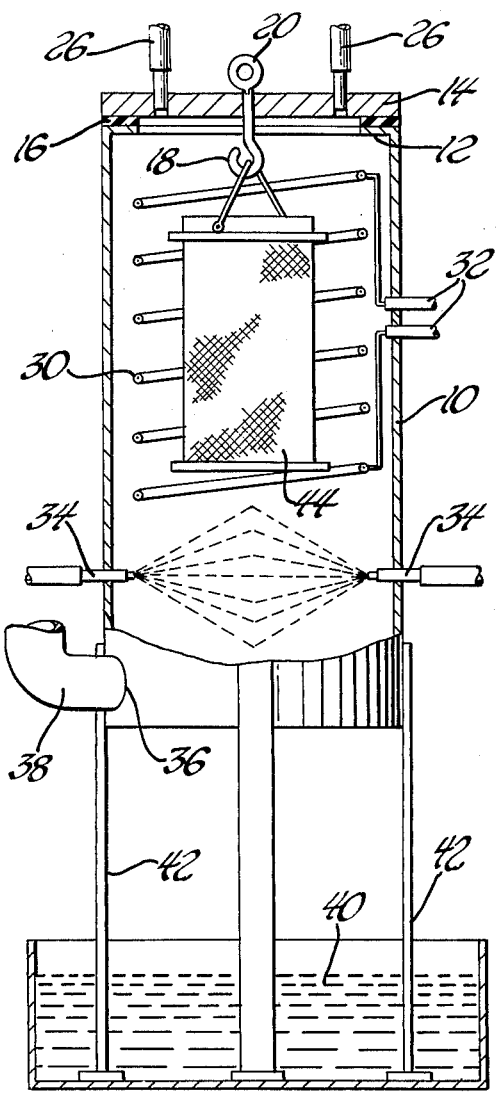

Other objectives, advantages and applications of the present invention will be made apparent by the following detailed description of a preferred embodiment of the invention. The description makes reference to the accompanying drawings in which:

FIG. 1 is a perspective view of a furnace for practicing the method of the present invention; and FIG. 2 is a sectional view of the furnace of FIG. 1 taken along line 2—2 of FIG. 1.

Referring to the drawings, the method of the present invention is preferably performed in an enclosure or a furnace built around a cylindrical metallic drum 10. The exact size of the drum is dependent upon the dimensions of the parts that are to be cleaned therein.

The drum has an inward extending flange 12 running around its upper edge and this flange serves to support a disc-shaped steel top cover 14 which rests on the flange 12 and thereby closes off the upper end of the cylinder. An annular resilient seal 16 is affixed to the lower edge of the top 14 with the weight of the top resting on the seal to securely join the two.

The top 14 has a hook 18 extending from its underside used to retain parts to be cleaned within the apparatus. The top 14 also has an eye 20 extending from its upper side adapted to be engaged by the hook 22 of a crane to lift the top in order to remove or insert parts to be cleaned. FIG. 1 illustrates the hook 22 engaging and lifting the top 14 through the eye 20. A pair of vent holes 24 are formed through the top 14 and they are connected to a suitable gas source (not shown) through hoses 26. The gas may be passed through the vents during operation to control the furnace atmosphere.

An induction heating coil 30 is spirally wound around the interior of the wall of the drum 10 and suitably supported in close separation to the wall. The ends of the coil 30 are connected to a suitable generator through leads 32 which pass through the wall of the drum. The coil 30 defines a heating volume.

A plurality of spray nozzles 34 are supported in the wall of the drum 10 below the heating coil 30. They are connected to a suitable pressurized water supply and act to spray inwardly toward the center of the drum so that any waste material falling off of a workpiece passes through the spray.

A vent 36 is formed in the side wall of the cylinder just above its lower end and connects to a ventilating stack 38.

The bottom end of the drum 10 is open and the drum is supported in an elevated position above a water tank 40 on a plurality of elongated legs 42.

In operation the top disc 14 is lifted from the cylinder by a hook crane, as illustrated in FIG. 1 and the hook 18 is supported below the top 14 which is engaged with a metallic article 44 to be cleaned of plastic. In the preferred embodiment, the metallic article comprises a screen pack for a filter. The article must be suspended so that it hangs below the hook. In alternate embodiments of the invention means other than a hook could be provided for supporting an article to be cleaned in the volume defined by the induction coil 30.

The top 14 is then lowered into place on the top of the flange 12 so that the screen pack 44 is surrounded by the heating coil 30. Suitable alternating current is then passed through the coil 30 to heat the metallic portion of the screen pack to a sufficient temperature to melt the plastic clinging thereto. In a preferred embodiment the plastic is polyethylene and the screen pack is heated to about 400° F. This temperature will melt the plastic adjacent to its interface with the screen pack. Gravitational forces on the plastic waste then tend to pull the waste away from the screen pack. Depending upon the exact configuration of the mass of plastic, additional melting may be required to allow the plastic to clear the pack. Because the plastic is non-conductive, no heating takes place in the mass of the plastic by virtue of the induced current but rather heat is conducted into the plastic at its interface with the screen pack. This is exactly the point at which it is desired to clean the screen pack of the plastic so this technique maximizes the energy efficiency of the process.

While the heating is going on, nitrogen is passed through the vents 24 from a suitable source (not shown) connected to the lines 26. A continuing forced flow is maintained during the entire heating process. Employing a cylinder of approximately 3 feet in diameter, a flow of 2 cubic feet per minute has been found sufficient. The vent 36 disposed at the bottom of the drum 10 carries off those fumes which are lighter than air. The stack 38 may be vented to atmosphere, or passed through a suitable filter, depending upon the fumes emanating from the particular type of plastic being cleaned from a metal surface.

The heating is continued until the mass of the plastic pulls away from the screen pack and falls to the bottom of the cylinder 10. As it does it is somewhat cooled by the water spray from the nozzle 34. It falls into the water contained in the tank 40 and is then quenched.

After the major mass of plastic has fallen away from the screen pack, its surfaces will be coated with a relatively thin layer retained by surface forces. After this mass has fallen, the current applied to the coil 30 is increased so as to raise the temperature of the screen pack beyond the auto-ignition temperature of the plastic. This causes the thin surface layer to decompose, leaving a clean metallic screen pack surface. In the case of polyethylene, the temperature of decomposition is about 750° to about 800° F and the screen pack temperature is raised to about 900° F to insure an adequate heat transfer into the plastic. After about 10 minutes, the polyethylene is totally decomposed and falls from the surface as either fumes or particles. The nitrogen flow is continued during this secondary heating cycle so that no combustion of the plastic takes place. The fumes which escape from the polyethylene during this stage are relatively minimal and are easily disposed of.

Using a screen pack having a diameter of 18 inches, the entire process requires about 35 minutes and results in a screen that is completely free of plastic waste. The energy requirements for the process are relatively low and the waste products are easily disposed of.

Having thus described my invention, I claim:

1. The method of removing polyethylene waste from a metallic element comprising suspending the element in an elevated position and inductively heating the element in an atmosphere purged of oxygen to a temperature below the auto-ignition point of the polyethylene but above its melting point until gravity pulls all of said waste with the exception of a thin layer away from said element, wherein melting of the polyethylene will occur only at its interface with the element, and then heating the element to a temperature above the auto-ignition point of the polyethylene for a sufficient period of time to cause decomposition of the remaining polyethylene so that no polyethylene residues remain on the metallic element.

2. The method of claim 1 wherein a body of liquid is disposed relative to said metallic element so that the polyethylene falling from said element falls into and is quenched by the liquid.

3. The method of removing plastic waste from a metallic element comprising: suspending the element in an elevated position and heating the element in an atmosphere purged of oxygen, by inductive heating, until the element reaches a temperature below the auto-ignition point but above the melting point of the plastic and until gravity pulls all of the plastic with the exception of a thin layer away from the element, wherein melting of the plastic will occur only at its interface with the element, and then heating the element at a temperature above the auto-ignition point of the plastic for a sufficient period of time to cause decomposition of the thin layer of plastic so that no plastic residues remain on the metallic element.

4. The method of claim 3 wherein the element is supported in an elevated position above a body of liquid so that said plastic falls into and is quenched by said liquid.

5. The method of claim 3 wherein the atmosphere in which the element is maintained is ventilated during heating.

* * * * *